United States Patent
Hakamata et al.

(10) Patent No.: US 8,997,912 B2
(45) Date of Patent: Apr. 7, 2015

(54) ELECTRIC MOTORCYCLE AND CONTROLLER UNIT

(75) Inventors: Osamu Hakamata, Shizuoka (JP); Akinori Honma, Shizuoka (JP); Kazuhiro Iida, Shizuoka (JP); Takeshi Nagao, Osaka (JP)

(73) Assignee: Suzuki Motor Corporation, Shizuoka (JP)

( * ) Notice: Subject to any disclaimer, the term of this patent is extended or adjusted under 35 U.S.C. 154(b) by 319 days.

(21) Appl. No.: 13/575,926

(22) PCT Filed: Jan. 25, 2011

(86) PCT No.: PCT/JP2011/051334
§ 371 (c)(1),
(2), (4) Date: Sep. 4, 2012

(87) PCT Pub. No.: WO2011/093279
PCT Pub. Date: Aug. 4, 2011

(65) Prior Publication Data
US 2012/0318600 A1    Dec. 20, 2012

(30) Foreign Application Priority Data
Jan. 28, 2010 (JP) .................. 2010-017215

(51) Int. Cl.
*B60K 1/04* (2006.01)
*B60K 7/00* (2006.01)
(Continued)

(52) U.S. Cl.
CPC .. *B62M 7/12* (2013.01); *B60K 1/04* (2013.01); *B60R 25/00* (2013.01); *B62K 11/10* (2013.01);
(Continued)

(58) Field of Classification Search
CPC ...... B62M 7/06; B62M 7/12; B62M 2204/00; B60K 7/0007; B60K 2001/043
USPC ................................. 180/220, 68.5
See application file for complete search history.

(56) References Cited

U.S. PATENT DOCUMENTS

2007/0007070 A1    1/2007    Sakata et al.
2008/0093148 A1*   4/2008    Takahashi ................. 180/220
(Continued)

FOREIGN PATENT DOCUMENTS

JP    H04358983 A    12/1992
JP    H05-116665     5/1993
(Continued)

OTHER PUBLICATIONS

Extended European Search Report dated Jun. 21, 2013, which issued during the prosecution of European Patent Application No. 11736992.6.
(Continued)

*Primary Examiner* — Anne Marie Boehler
(74) *Attorney, Agent, or Firm* — Troutman Sanders LLP

(57) ABSTRACT

Disclosed is an electric motorcycle provided with: an electric motor (M) for driving a rear wheel (110) which is a drive wheel; a battery (B) for supplying power to the electric motor (M); and a controller unit (130) for performing drive control of the electric motor (M). The electric motorcycle is of the scooter type in which a footrest section is constructed between the front wheel (105) and the rear wheel (110), and is provided with a controller housing compartment (129) disposed in the footrest section so as to be downwardly recessed. An opening (131) is formed in the bottom of the controller housing compartment (129), and a cooling fin (130*c*) is provided in the bottom surface of the controller unit (130) in a state in which the cooling fin (130*c*) is housed in the controller housing compartment (129) and downwardly protrudes from the opening (131) to face the outside. As a result, the controller unit (130) is directly and efficiently cooled by airflow produced during travel.

19 Claims, 14 Drawing Sheets

(51) Int. Cl.
  *B62M 7/12* (2006.01)
  *B60R 25/00* (2013.01)
  *B62K 11/10* (2006.01)
  *B60K 1/00* (2006.01)

(52) U.S. Cl.
  CPC ......... *B60K 7/0007* (2013.01); *B60K 2001/003* (2013.01); *B60K 2001/0422* (2013.01); *B60K 2007/0038* (2013.01); *B60K 2007/0092* (2013.01); *B60Y 2200/126* (2013.01); *B62K 2202/00* (2013.01); *B62K 2204/00* (2013.01); *B60Y 2400/61* (2013.01)

(56) References Cited

U.S. PATENT DOCUMENTS

| | | | |
|---|---|---|---|
| 2010/0078249 A1* | 4/2010 | Nishiura et al. | 180/220 |
| 2011/0061960 A1* | 3/2011 | Matsuoka et al. | 180/220 |
| 2012/0197470 A1* | 8/2012 | Inui | 701/22 |
| 2012/0199409 A1* | 8/2012 | Nakamura et al. | 180/220 |

FOREIGN PATENT DOCUMENTS

| | | |
|---|---|---|
| JP | H06-135370 | 5/1994 |
| JP | H07-112693 | 5/1995 |
| JP | H07117487 A | 5/1995 |
| JP | H11-079045 | 3/1999 |
| JP | 2001-114173 | 4/2001 |
| JP | 2003002273 A | 1/2003 |
| JP | 3515596 | 4/2004 |
| JP | 2005-104245 | 4/2005 |
| JP | 2006-341712 | 12/2006 |
| JP | 2011-234559 | 11/2011 |

OTHER PUBLICATIONS

International Preliminary Report on Patentability, dated Sep. 18, 2012, which issued during the prosecution of International Patent Application No. PCT/JP2011/051334.
International Search Report and Written Opinion, dated Apr. 26, 2011, which issued during the prosecution of International Patent Application No. PCT/JP2011/051334.
Japanese Office Action dated May 13, 2014, which issued during prosecution of Japanese Application No. 2011-551852.
JP Utility Model S62-5570, Jan. 13, 1987, Yazaki Co.

* cited by examiner

ELECTRIC MOTORCYCLE AND CONTROLLER UNIT

CROSS-REFERENCE TO RELATED APPLICATIONS

This is a U.S. national phase application under 35 U.S.C. §371 of International Patent Application No. PCT/JP2011/051334, filed on Jan. 25, 2011, and claims benefit of priority to Japanese Patent Application No. 2010-017215, filed on Jan. 28, 2010. The International Application was published on Aug. 4, 2011 as International Publication No. WO/2011/093279 under PCT Article 21(2). The entire contents of these applications are hereby incorporated herein by reference.

TECHNICAL FIELD

The present invention relates to a scooter-type electric motorcycle using an electric motor as a drive source, and a controller unit suitable to be used therein.

BACKGROUND ART

In recent years, motorcycles using electric motors as drive sources have been developed in view of environmental conservation. When the electric motor is used as the drive source, a battery supplying electric power to the electric motor and a controller unit (motor control device) performing drive control of the electric motor are mounted. In such a case, since the controller unit generates heat, it is required to secure a heat release performance.

Patent Literature 1 discloses a configuration in which, in a scooter-type electric motorcycle, an electric motor is disposed near behind a footrest and a controller is disposed near above the electric motor, and a ventilation passage to cause traveling air flowing below the footrest to run is formed between a plate-shaped structure positioned in upper front of a rear wheel and the controller.

Further, Patent Literature 2 discloses a configuration in which, in a scooter-type hybrid motorcycle, a driver performing drive control of a drive motor is disposed in an upper surface of a plate section positioned below a step floor. Further, a configuration in which a fin for releasing heat is integrally formed in a lower surface of the plate section is disclosed.

CITATION LIST

Patent Literature

Patent Literature 1: Japanese Patent No. 3515596
Patent Literature 2: Japanese Laid-open Patent Publication No. 2005-104245

SUMMARY OF INVENTION

Technical Problem

However, in Patent Literature 1, the controller is disposed near above the electric motor near behind the footrest, that is, below a seat, and it is necessary to form the ventilation passage for leading the traveling air to near the controller.

Further, in a case where a battery is attached/detached for charging or the like, it is suitable to dispose the battery below the openable/closable seat in view of a comfortable posture during an attachment/detachment operation, but in Patent Literature 1, the controller being disposed below the seat, it is not possible to dispose the battery below the seat.

In Patent Literature 2, though the plate section positioned below the step floor is directly cooled by the traveling air, it is configured so that the driver contacting the upper surface of the plate section is cooled indirectly, and thus cooling cannot be performed efficiently.

The present invention is made in view of the above-described problems, and its object is to cool a controller unit by traveling air directly and efficiently in a scooter-type electric motorcycle using an electric motor as a drive source.

Solution to Problem

An electric motorcycle of the present invention is a scooter-type electric motorcycle and is characterized in that the electric motorcycle has: an electric motor driving a rear wheel being a drive wheel; a battery supplying electric power to the electric motor; a controller unit performing drive control of the electric motor; a footrest section constructed between a front wheel and the rear wheel; and a controller housing compartment provided in a manner to be recessed downward in the footrest section, that an opening is formed in a bottom of the controller housing compartment, and that the controller unit is provided, in its bottom surface, with a cooling fin protruding downward from the opening to face the outside in a state of being housed in the controller housing compartment.

The electric motorcycle of the present invention is also characterized in that the opening is closed by the bottom surface of the controller unit, and that, in the bottom of the controller housing compartment, a resilient member to cohere to the bottom surface of the controller unit is provided around the opening.

The electric motorcycle of the present invention is also characterized in that a plurality of cooling fins of thin plate shapes extended in the front and the rear is provided in parallel in the bottom surface of the controller unit.

The electric motorcycle of the present invention is also characterized in that, inside the controller unit, a circuit component whose heating value is comparatively large is disposed in a front side in a vehicle traveling direction.

The electric motorcycle of the present invention is also characterized in that, in the bottom surface of the controller unit, a rear half section in the vehicle traveling direction bulges more downward than a front half section, that a circuit component comparatively tall and having a small heating value is disposed inside the rear half section, and that the cooling fins are provided only in a bottom surface of the front half section.

The electric motorcycle of the present invention is also characterized in that, in the bottom surface of the controller unit, a front wall of the rear half section forming a step section between the front half section and the rear half section inclines diagonally downward to the rear.

The electric motorcycle of the present invention is also characterized in that a height of the cooling fin of an outer side in the vehicle width direction among the cooling fins from the bottom surface of the controller unit is formed lower than a height of the cooling fin of an inner side in the vehicle width direction.

The electric motorcycle of the present invention is also characterized in that the controller unit is disposed to be deflected in either side in the vehicle width direction in the footrest section.

The electric motorcycle of the present invention is also characterized in that the electric motorcycle has: a swing arm provided in a vehicle body frame in a manner to be vertically swingable, supporting the rear wheel in a manner to be freely rotatable, and supporting a power unit including the electric motor in one side in the vehicle width direction of the rear wheel, and that the controller unit is disposed to be deflected in an opposite side in the vehicle width direction to the power unit including the electric motor.

The electric motorcycle of the present invention is also characterized in that the controller unit has a configuration in which a connection section is provided in a front part or a rear part and a connection line connected to the connection section is led out toward a center in the vehicle width direction.

The electric motorcycle of the present invention is also characterized in that the controller unit has a configuration in which a connection section is provided in a side part of a center side in the vehicle width direction and a connection line connected to the connection section is led out toward one side in the vehicle width direction where the electric motor is mounted.

The electric motorcycle of the present invention is also characterized in that the electric motorcycle has: a swing arm provided in the vehicle body frame in a manner to be vertically swingable, supporting the rear wheel in a manner to be freely rotatable, and supporting the power unit including the electric motor in one side in the vehicle width direction of the rear wheel, and that at least a part of the controller unit and a pivot shaft of the swing arm are at the same height position.

A controller unit of the present invention is characterized in that the controller unit has: a case having an internal space; a circuit board housed in the internal space of the case; a terminal section electrically connected to the circuit board and drawn out to a side surface of the case; and a terminal board provided in a side surface of an outer side of the case and holding the terminal section, and that the terminal board is provided with a guide section guiding a leading out direction of the connection line connected to the terminal board in a diagonal direction in relation to the side surface.

The controller unit of the present invention is also characterized in that the guide section provided in the terminal board has a recessed section in which a ring terminal of the connection line is fit.

The controller unit of the present invention is also characterized in that a plurality of terminal sections is held adjacently in the terminal board, that the terminal board has the plurality of adjoining recessed sections and partition walls standingly provided between the recessed sections as the guide sections corresponding to the respective terminal sections, and that the partition walls are provided in a manner that both side surfaces thereof are in the diagonal direction in relation to the side surface of the case.

The controller unit of the present invention is also characterized in that a cooling fin is provided in a surface different from the side surface of the case in which the terminal board is provided.

Advantageous Effects of Invention

According to an electric motorcycle of the present invention, since a cooling fin of a controller unit protrudes downward to face the outside in a rear side of a footrest section, the controller unit is cooled by traveling air directly and efficiently even if a ventilation passage is not particularly formed.

According to a controller unit of the present invention, since a terminal board provided in a side surface of a case is provided with a guide section guiding a leading out direction of a connection line in a diagonal direction in relation to the side surface, the connection line can be led out in the diagonal direction in relation to the side surface. Therefore, even when the connection line is wired by being bent in an opposite side to the side surface of the case, an effect is exhibited that improvement of a workability of assembling the connection line is possible or improvement of disadvantage such as wire breakage by relieving a load to the connection line due to bending is possible, compared with a conventional controller unit, that is, a controller unit having a configuration in which a connection line is led out vertically in relation to a side surface of a case.

The controller unit of the present invention is suitable to be used when a connection line is required to be bent and housed due to restriction of a space for arranging components as in, for example, an electric motorcycle. Particularly in an electric motorcycle having an electric motor, a battery, and a controller unit to be electrically connected thereto, when the battery provided near a seat, the electric motor provided more backward (for example, near a rear wheel) than the battery, and a controller unit provided more forward (for example, near a footrest section) than the battery are disposed in a manner to be arranged in a front and rear direction, contribution of the above effect by adopting the controller unit of the present invention as a controller unit is large.

DESCRIPTION OF EMBODIMENTS

Hereinafter, preferred embodiments of the present invention will be described with reference to the attached drawings.

First Embodiment

Figure 1:
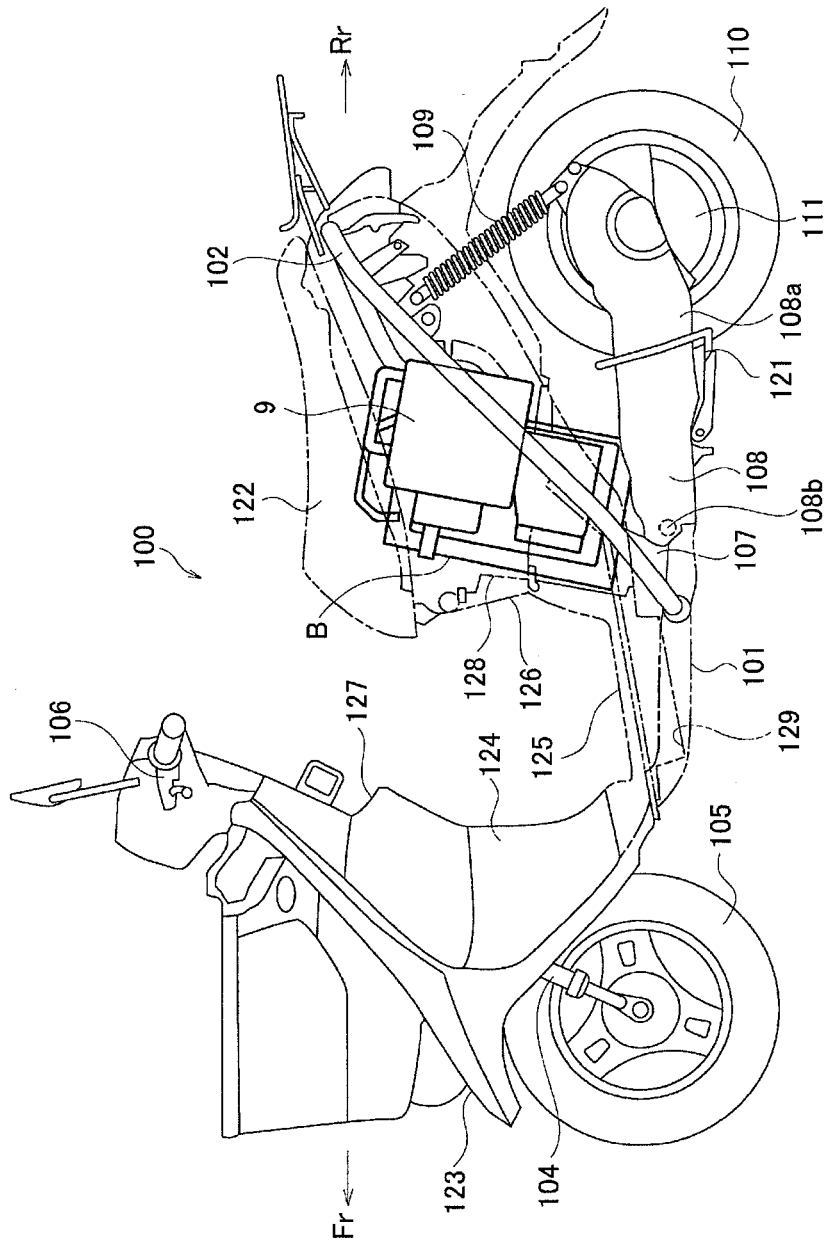
FIG. 1 is a left side surface view of an electric motorcycle according to a first embodiment.

FIG. 1 shows a left side surface of a scooter-type electric motorcycle 100 according to this embodiment. Note that in an important point in each drawing referred to below, the front is indicated by an arrow Fr and the rear is indicated by an arrow Rr, respectively.

As shown in FIG. 1, a vehicle body frame of the electric motorcycle 100 is configured to include a not-shown head pipe, a down tube 101 extended downward from the head pipe and extendedly provided almost horizontally toward the rear from the middle, and right and left rear frames 102 extendedly provided from a rear end part of the down tube 101 to rear upward. Further, right and left auxiliary frames 103 are extendedly provided horizontally or slightly upper toward the rear from a lower part of the down tube 101 and are coupled with the rear frames 102, respectively (See FIG. 4)

Right and left two front forks 104 are supported rotatably in right and left by the not-shown head pipe. A front wheel 105 is supported by lower parts of the front forks 104 in a manner to be freely rotatable, and the front wheel 105 is steered right and left by a handle bar 106.

Front ends of swing arms 108 are provided in a manner to be vertically swingable by being pivotally supported by brackets 107 of lower parts of the right and left rear frames 102 via a pivot shaft 108b. The swing arm 108 is a cantilever type swing arm (see FIG. 2) in which an arm section 108a is extended backward only in a left side of a vehicle, and a rear suspension 109 is bridged between a rear end part of the arm section 108a and the rear frame 102.

Figure 3:
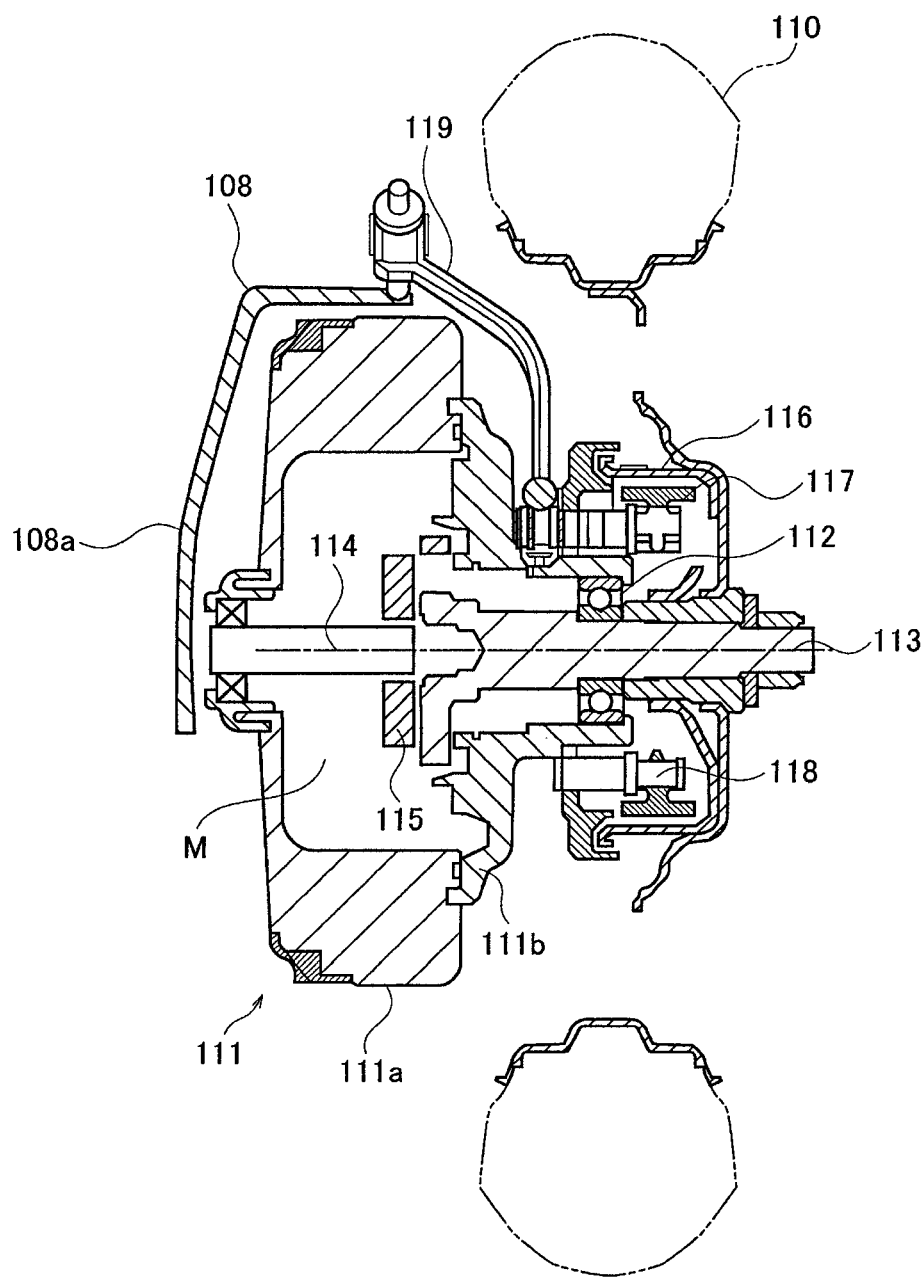
FIG. 3 is a cross-sectional view showing a configuration of the power unit of the electric motorcycle according to the first embodiment.

As shown in FIG. 3, a rear wheel 110 being a drive wheel and a power unit 111 which includes an electric motor M driving the rear wheel 110 are supported by the rear end part of the arm section 108a of the swing arm 108. The power unit 111 has a disc-shaped case 111a and a cover 111b covering an internal surface of the case 111a, in which the electric motor M is housed. Note that illustration of a concrete configuration of the electric motor M is omitted. Further, a rear axle 113 of the rear wheel 110 is supported by a bearing 112 provided in an inner peripheral surface of a cylinder part of the cover 111b, and rotation of an output shaft 114 of the electric motor M is transmitted to the rear axle 113 via a speed reducer 115.

In an inner surface side of the rear wheel 110 is provided a cylindrical brake drum 116 disposed coaxially with the rear axle 113, and a brake shoe 117 is provided inside the brake drum 116. The brake shoe 117 is operated by a brake actuating lever 119, with an anchor pin 118 protrudingly provided in the power unit 111 side being a fulcrum, and at a time of operation of the brake, the brake shoe 117 pressure-contacts an inner surface of the brake drum 116.

Figure 2:
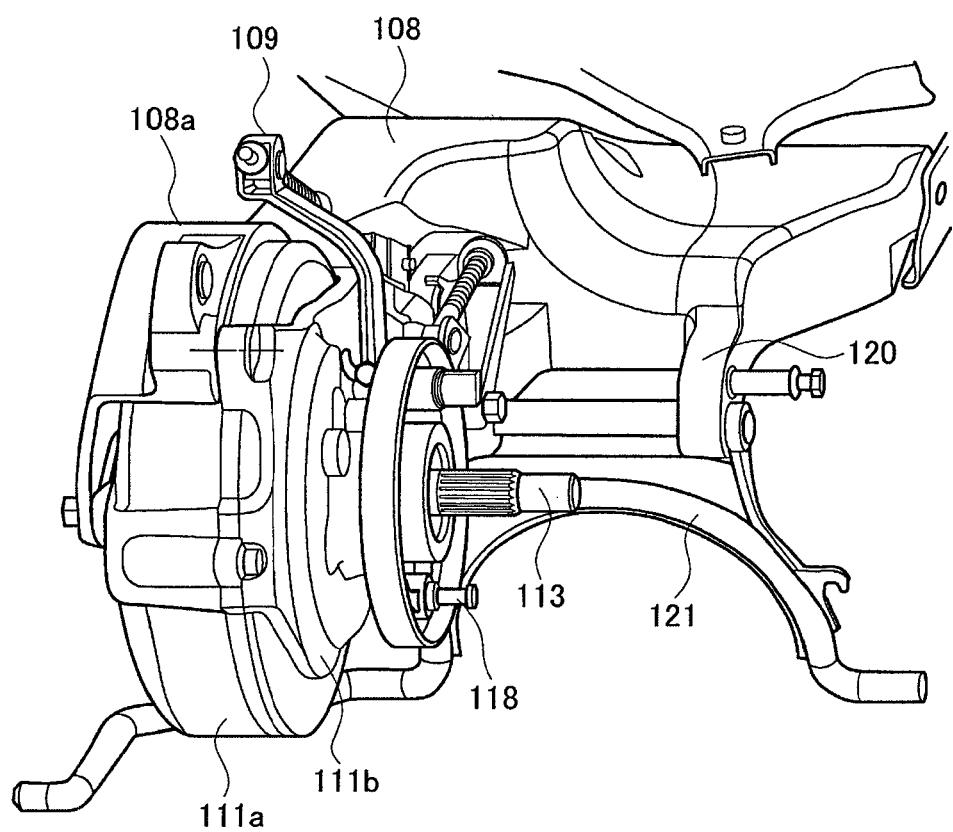
FIG. 2 is a perspective view of a swing arm and the vicinity of a power unit of the electric motorcycle according to the first embodiment, seen from the rear.

Further, right and left bracket sections 120 are formed in the middle of the swing arms 108, and a stand 121 is mounted on the bracket sections 120 (see FIG. 2).

Below a driver seat 122, a housing box 128 is provided between the right and left rear frames 102 as a housing section, and a battery B supplying electric power to the electric motor M is housed attachably/detachably in the housing box 128. The driver seat 122, its front part being supported in a manner to be freely pivotable vertically by a hinge mechanism, is openable/closable and doubles as a cover of the housing box 128. Since the battery B is disposed below the openable/closable driver seat 122 as described above, a posture during an attaching/detaching operation of the battery B is comfortable.

A vehicle body frame is covered by a resinous vehicle body cover, which constitutes an outer appearance of the vehicle. The vehicle body cover is constituted by combining a front leg shield 123, a rear leg shield 124, a lower cover 125, a rear frame cover 126, and so on. The front leg shield 123 is disposed in a manner to cover a vehicle front part and also constitutes a front fender. The rear leg shield 124 is disposed in a manner to cover a rear side of the front leg shield 123, and a pocket section 127 for storage is formed. The lower cover 125 is continuously provided from the front leg shield 123, disposed in a manner to cover the lowest below the driver seat 122 from the right and left auxiliary frames 103, and constitutes a footrest section on which a rider puts feet. The rear frame cover 126 is disposed to cover the rear frame 102 below the driver seat 122.

In the electric motorcycle 100 according to this embodiment, a controller housing compartment 129 is provided in a manner to be recessed downward in the footrest section, and a controller unit 130 is housed in the controller housing compartment 129. The controller unit 130, details being described later with reference to FIG. 7, controls electric power supply from the battery B to the electric motor M thereby to perform drive control of the electric motor M.

Figure 4:
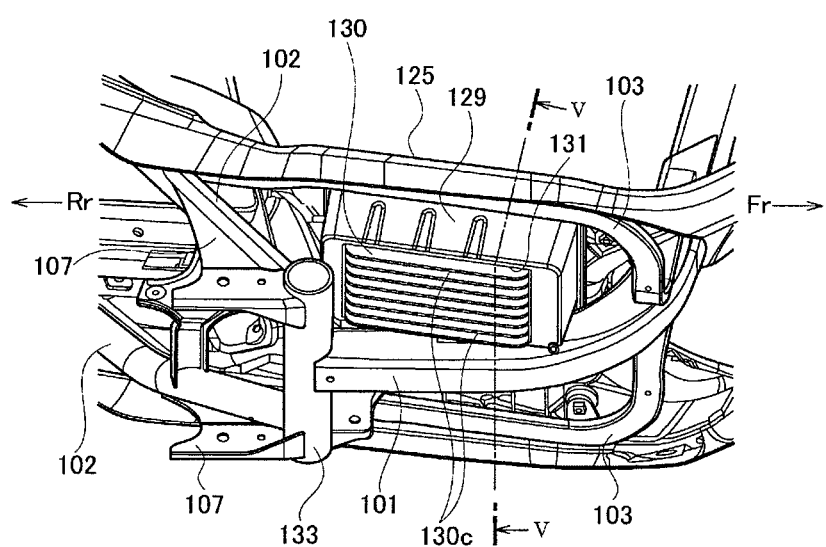
FIG. 4 is a partial perspective view of a bottom surface side of the electric motorcycle according to the first embodiment.
Figure 5:
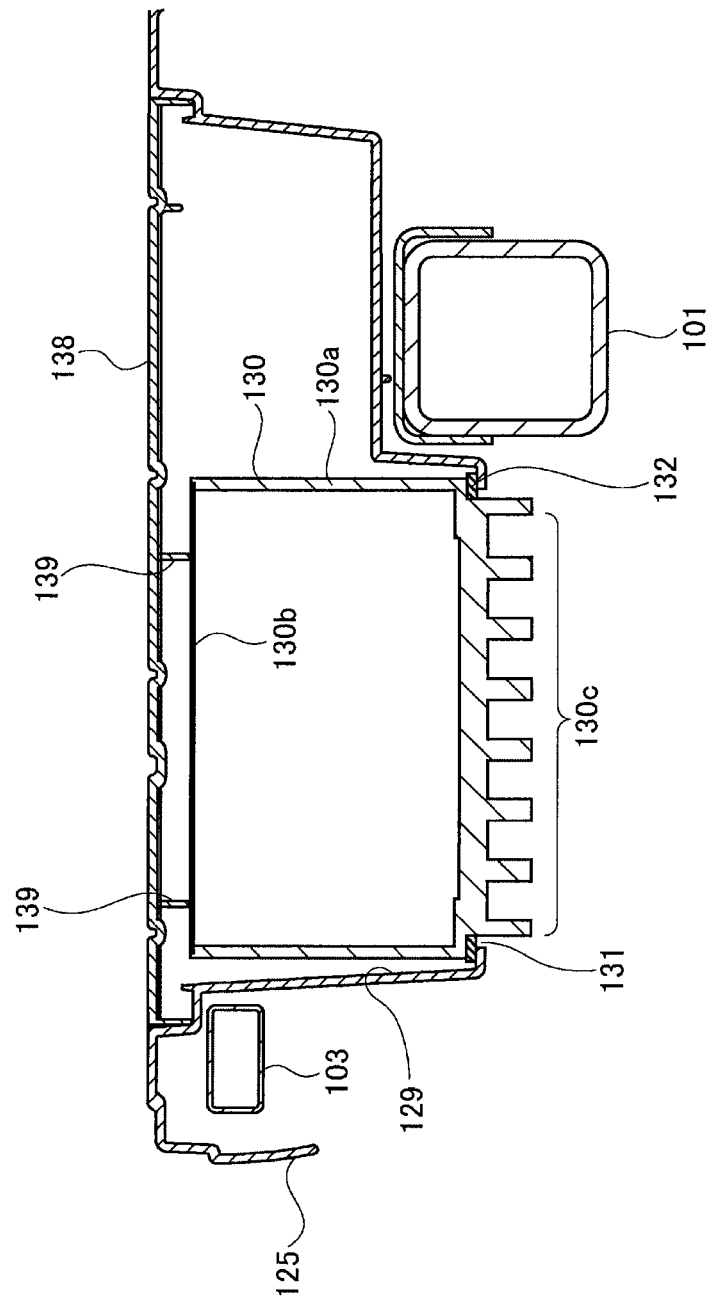
FIG. 5 is a partial cross-sectional view taken along a line V-V in FIG. 4.
Figure 6:
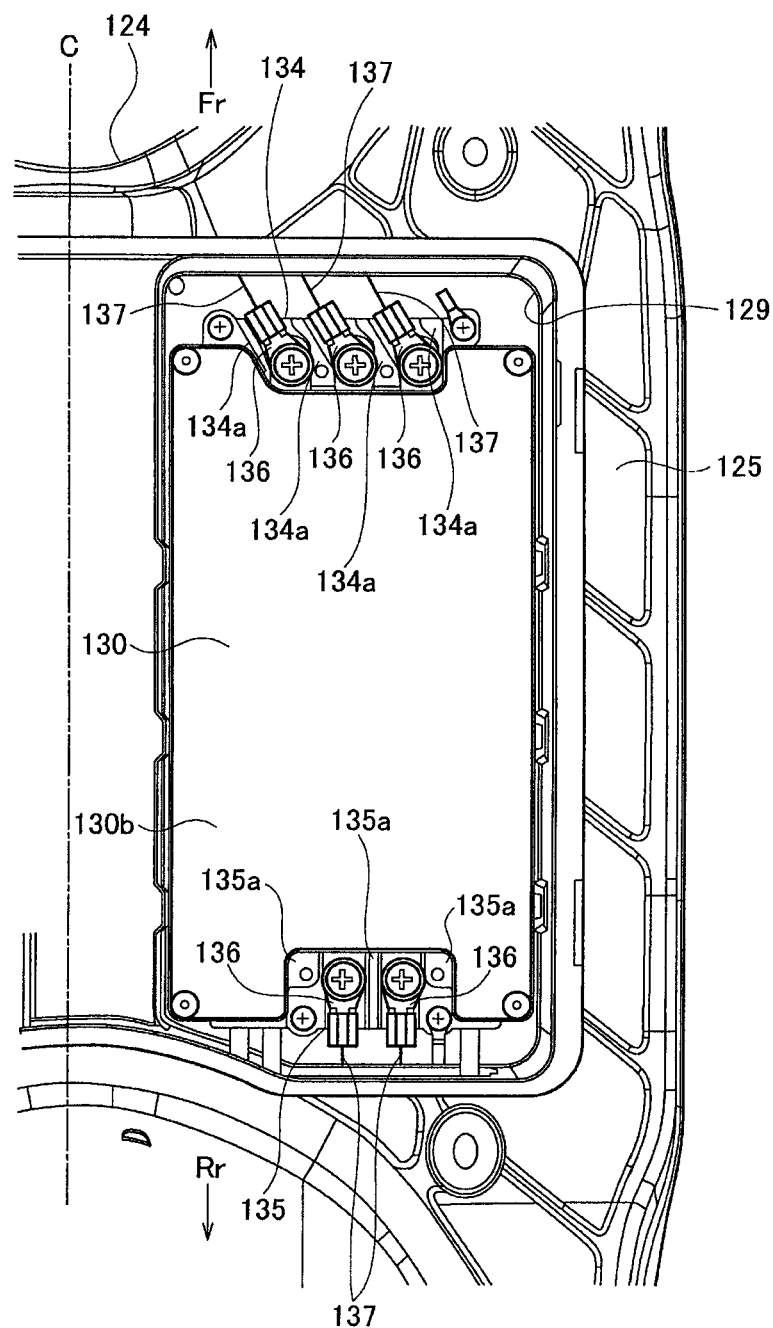
FIG. 6 is a plan view showing a part of a footrest section in the first embodiment.

FIG. 4 is a partial perspective view of a bottom surface side of the electric motorcycle 100. Besides, FIG. 5 is a partial cross-sectional view taken along a line V-V in FIG. 4. Further, FIG. 6 is a plan view (view seen from an arrow B direction) showing a part of the footrest section. The lower cover 125 covers upper sides of the down tube 101 and of the right and left auxiliary frames 103, and outer sides of the right and left auxiliary frames 103, thereby to constituted the footrest section.

Here, in the lower cover 125, the controller housing compartment 129 is formed in a manner to be recessed downward, deflected in a right side of the vehicle. As shown in FIG. 5, an upper surface of the lower cover 125 is recessed downward above the down tube 101 and recessed further down in a range from a right side of the down tube 101 to an inner side of the right-side auxiliary frame 103, and a recess between the down tube 101 and the right-side auxiliary frame 103 is used as the controller housing compartment 129. Further, an opening 131 is formed in a bottom of the controller housing compartment 129, and a resilient member 132 is provided around the opening 131.

The controller unit 130 has a metal case 130a of a box shape long in a front and rear direction and a cover 130b closing an upper surface opening of the metal case 130a, and not-shown CPU (Central Processing Unit), ROM, RAM, and so on are housed therein. In a bottom surface of the controller unit 130, that is, in a bottom surface of the metal case 130a, a plurality of cooling fins 130c of thin plate shapes extended in the front and rear direction is integrally formed. The plural cooling fins 130c are aligned in parallel by a predetermined pitch in a vehicle width direction, and traveling air flows backward thorough between the cooling fins 130c while the vehicle runs.

When the controller unit 130 is housed in the controller housing compartment 129, the opening 131 is closed by the bottom surface of the controller unit 130 and the resilient member 132 coheres to an edge part of the bottom surface of the controller unit 130. The resilient member 132 functions as a cushioning member for alleviating an impact applied from a road surface or the like to the controller unit 130, a sealing member for preventing infiltration of muddy water or the like splashed by the front wheel 105, and a heat insulating member for not letting heat of the controller unit 130 be transmitted to the lower cover 125.

Further, when the controller unit 130 is housed in the controller housing compartment 129, as shown in FIG. 4 and FIG. 5, the cooling fins 130c of the bottom surface of the controller unit 130 protrude downward from the opening 131 and face the outside. In such a case, as shown in FIG. 5, to prevent the cooling fin 130c from contacting the road surface, a height position of cooling fins 130c is upper than those of the down tube 101 and a branch tube 133 (see FIG. 4) connecting the down tube 101 and the right and left rear frames 102. Further, if a size relationship is set so that a front end and a rear end of each cooling fin 130c abut on a front edge part and a rear edge part of the opening 131 respectively and that the right and left cooling fins 130c abut on the front edge part and the rear edge part of the opening 131 respectively, positioning of the controller unit 130 can be determined by using the opening 131.

Further, as shown in FIG. 6, a size relationship is that a side surface of the controller unit 130 is close to a side wall of the controller housing compartment 129 and that a front surface and a rear surface of the controller unit 130 face a front wall and a rear wall of the controller housing compartment 129 with spaces.

As shown in FIG. 6, terminal boards 134, 135 are disposed as connection sections in the front and the rear of the controller unit 130. A connection line of the electric motor M is connected to the terminal board 134 of the front side. Further, a connection line of the battery B is connected to the terminal board 135 of the rear side. To the terminal boards 134, 135, ring terminals 136 of respective connection lines are to be screwed. Note that in FIG. 6, connection lines 137 connected to rear ends of the ring terminals 136 are illustrated simply.

Here, in the terminal board 134, partition walls 134a are standingly provided to adjoin the respective ring terminal 136, and these partition walls 134a are diagonally disposed so that their front end parts face a center in the vehicle width direction. In other words, the ring terminal 136 is put diagonally from a center side in the vehicle width direction and screwed, whereby the connection line 137 can be led out toward the center in the vehicle width direction. The connection line 137 penetrates a hole formed in the front wall of the controller housing compartment 129 and led out to out of the controller housing compartment 129. As a result of a configuration in which the connection line 137 is led out toward the center in the vehicle width direction as above, a distance between the ring terminal 136 and the front wall of the controller housing compartment 129 can be obtained, and thereby assembling can be done in a narrower space compared with a case where the ring terminal 136 is put straight from the front and screwed. Further, by adopting the configuration in which the connection line 137 is led out toward the center in the vehicle width direction, the connection line 137 can be led to the electric motor M without being forcedly bent.

Further, also in the terminal board 135, partition walls 135a are standingly provided to adjoin the ring terminals 136, but those partition walls 135a are disposed straight. The connection line 137 penetrates a hole formed in the rear wall of the controller housing compartment 129 and led out to out of the controller housing compartment 129. Note that though in this embodiment explanation is done for a case of adopting the configuration in which the connection line 137 is led out toward the center in the vehicle width direction in the terminal board 134 side, a similar configuration can be adopted also in the terminal board 135 side.

In a state where the controller unit 130 is housed in the controller housing compartment 129 as described above, the recess formed in the lower cover 125 is closed, as shown in FIG. 5, by a foot board 138 constituting the footrest section. Ribs 139 are standingly provided in a rear surface of the foot board 138, and it is configured so that when the foot board 138 is closed the ribs 139 press an upper surface of the controller unit 130 to prevent jounce.

As described above, the cooling fins 130c of the controller unit 130 protrude downward to face the outside, in the rear side of the footrest section. In a scooter-type motorcycle, a place below a footrest section is a place in which traveling air flows most, and since the cooling fins 130c of the controller unit 130 are made to face such a place, the controller unit 130 is cooled by traveling air directly and efficiently even if a ventilation passage is not particularly formed.

Further, since the controller unit 130 is housed in the controller housing compartment 129 provided in a manner to be recessed downward in the footrest section, as shown in FIG. 1 the height position of the controller unit 130 is almost the same as the height position of the pivot shaft 108b of the swing arm 108 and further the power unit (electric motor) 111 supported by the swing arm 108. In other words, at least a part of the controller unit 130 and the pivot shaft 108b of the swing arm 108 are at the same height position. Thereby, it is hardly necessary to bend the connection line 137 connecting the terminal board 135 and the electric motor M in the vertical direction, resulting in a short wiring distance, so that a cost and a weight can be reduced. Further, since the connection line 137 connecting the terminal board 135 and the electric motor M runs near the pivot shaft 108b, a movement amount of the connection line 137 concurrent with swing of the swing arm 108 is small, so that durability of the connection line 137 can be improved.

Further, as shown in FIG. 6, the rear leg shield 124 is bent and protrudes backward in the front side of the footrest section, while the vehicle body cover below the driver seat 122 is bent and protrudes forward in the rear side. In other words, a length in the front and rear direction of the footrest section is shortest at a vehicle body center line C connecting ground points of the front wheel 105 and the rear wheel 110. Thus, by disposing the controller housing compartment 129 in a manner to be deflected in either one side in the vehicle width direction, the length in the front and rear direction of the controller housing compartment 129 can be secured.

Hereinafter, a configuration of the controller unit 130 and its periphery will be described in detail.

(Circuit Function of Circuit Unit)

Figure 7:
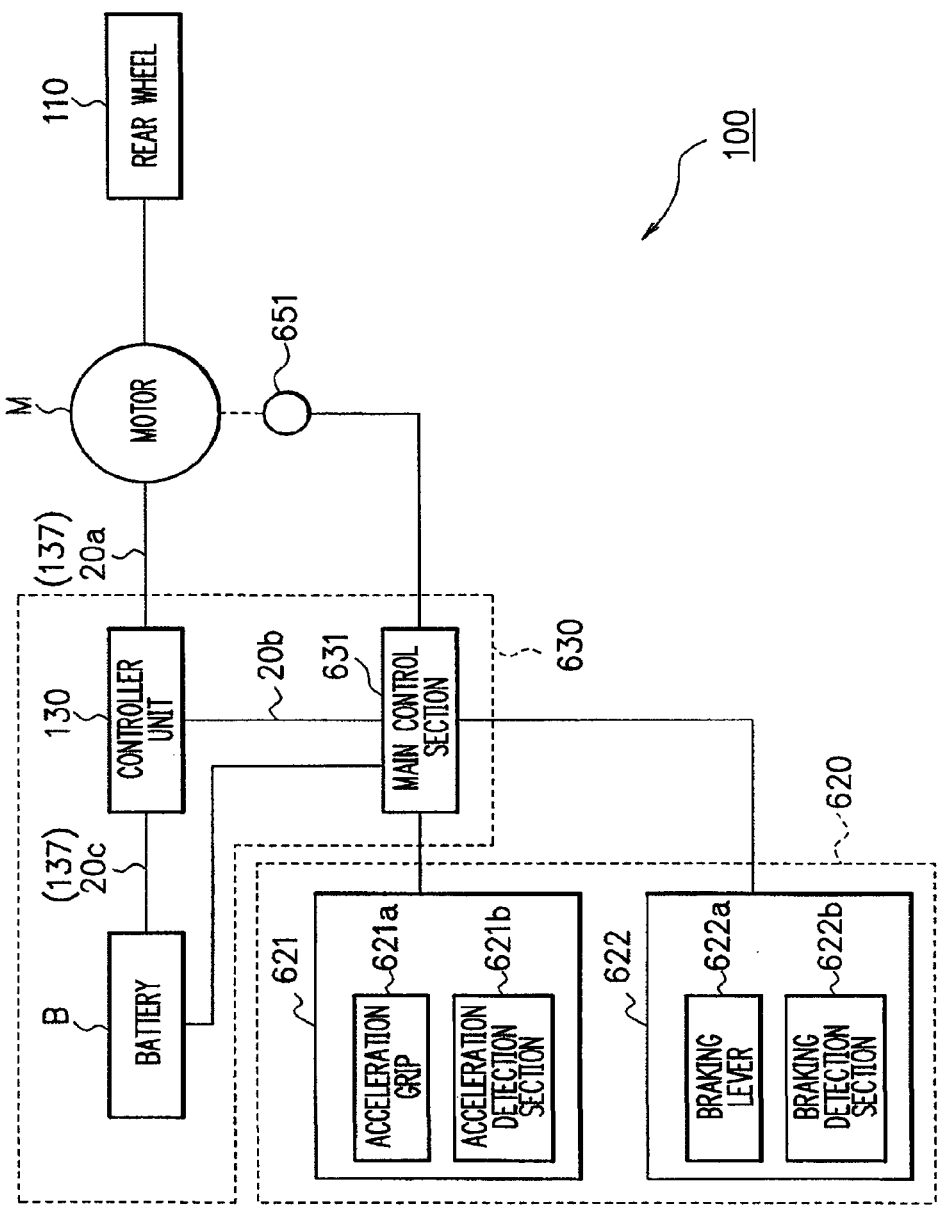
FIG. 7 is a block diagram showing a circuit configuration of a periphery of a controller unit according to the first embodiment.

As shown in FIG. 7, the electric motorcycle 100 has, as constituent elements of a control system to adjust a rotational force of the rear wheel 110, the controller unit 130, a main control section 631, the battery B, an acceleration device 621, a braking device 622, a rotation speed sensor 651, and the electric motor M.

Here, the acceleration device 621 has an acceleration grip 621a and an acceleration detection section 621b. Further, the braking device 622 has a braking lever 622a and a braking detection section 622b. The rotation speed sensor 651 is housed in the electric motor M. Note that the electric motor M houses a speed reducer.

The battery B includes a plurality of battery modules and a battery ECU (Electronic Control Unit). The plural battery modules of the battery B are connected to the electric motor M via the controller unit 130. The battery ECU of the battery B is connected to the main control section 631. Thereby, the main control section 631 is given a charge amount of the plural battery modules by the battery ECU.

The acceleration device 621, the braking device 622, and the rotation speed sensor 651 are connected to the main control section 631. The main control section 631 is constituted by, for example, a CPU (Central Processing Unit) and a memory, or a microcomputer.

When the acceleration grip 621*a* is operated by a driver, an operation amount of the acceleration grip 621*a* is detected based on an unoperated state as a standard by the acceleration detection section 621*b*. The detected operation amount of the acceleration grip 621*a* is given to the main control section 631.

Further, when the braking lever 622*a* is operated by the driver, an operation amount of the braking lever 622*a* is detected based on an unoperated state as a standard by the braking detection section 622*b*. The detected operation amount of the braking lever 622*a* is given to the main control section 631.

The rotation speed sensor 651 detects a rotation speed of the electric motor M. The detected rotation speed is given to the main control section 631.

As described above, the main control section 631 is given information of the charge amount of the battery modules, the operation amount of the acceleration grip 621*a*, the operation amount of the braking lever 622*a*, the rotation speed of the electric motor M, and so on. The main control section 631 performs charge/discharge control of the battery modules and electric power conversion control of the controller unit 130, based on the above information.

For example, when the electric motorcycle 100 starts moving or accelerates based on an acceleration operation, electric power of the battery modules is supplied from the battery B to the controller unit 130. Further, the main control section 631 calculates a rotation force to transmit to the rear wheel 110 as a command torque based on the provided operation amount of the acceleration grip 621*a*, and provides a control signal based on the command torque to the controller unit 130. The controller unit 130, based on the control signal from the main control section 631, controls the electric power supplied from the battery B, and converts to electric power (drive power) necessary for driving the rear wheel 110. Thereby, the drive power converted by the controller unit 130 is supplied to the electric motor M, and the rotation force of the electric motor M based on the drive power is transmitted to the rear wheel 110.

On the other hand, when the electric motorcycle 100 decreases speed based on a braking operation, the electric motor M functions as an electric power generating device. In this case, the controller unit 130 converts regenerative electric power generated by the electric motor M into electric power suitable for charging of the battery module, and provides to the battery module. Thereby, the battery module is charged.

(Detail of Controller Unit 130)

Figure 8:
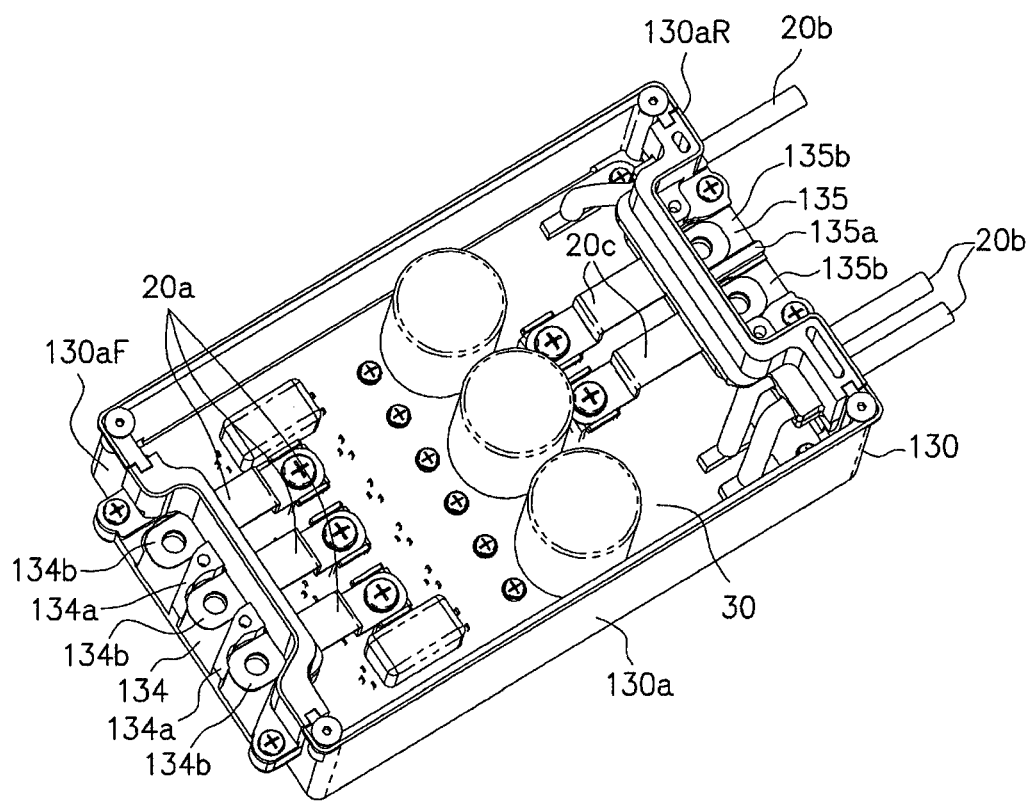
FIG. 8 is a perspective view showing a metal case interior of the controller unit according to the first embodiment.
Figure 9:
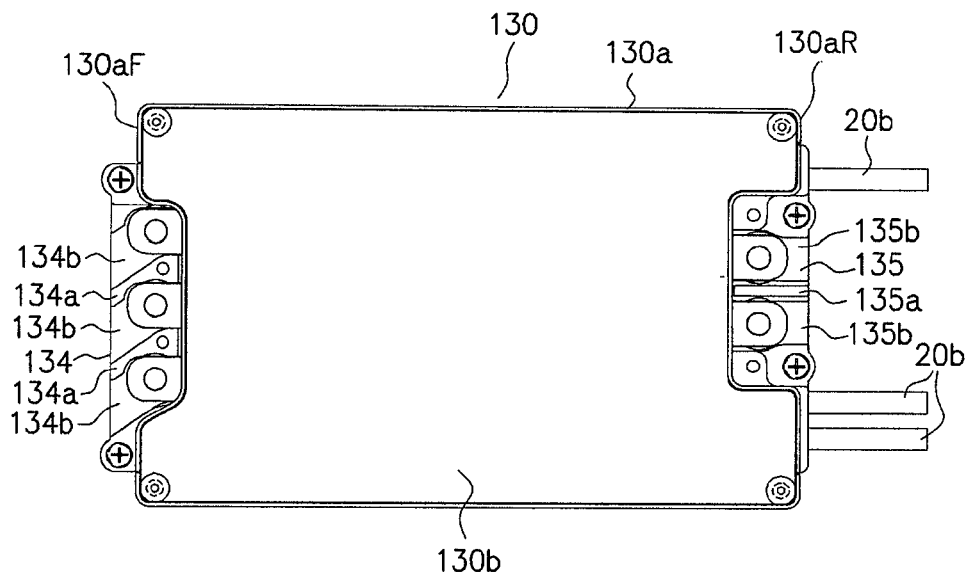
FIG. 9 is a plan view of the controller unit according to the first embodiment.
Figure 10:
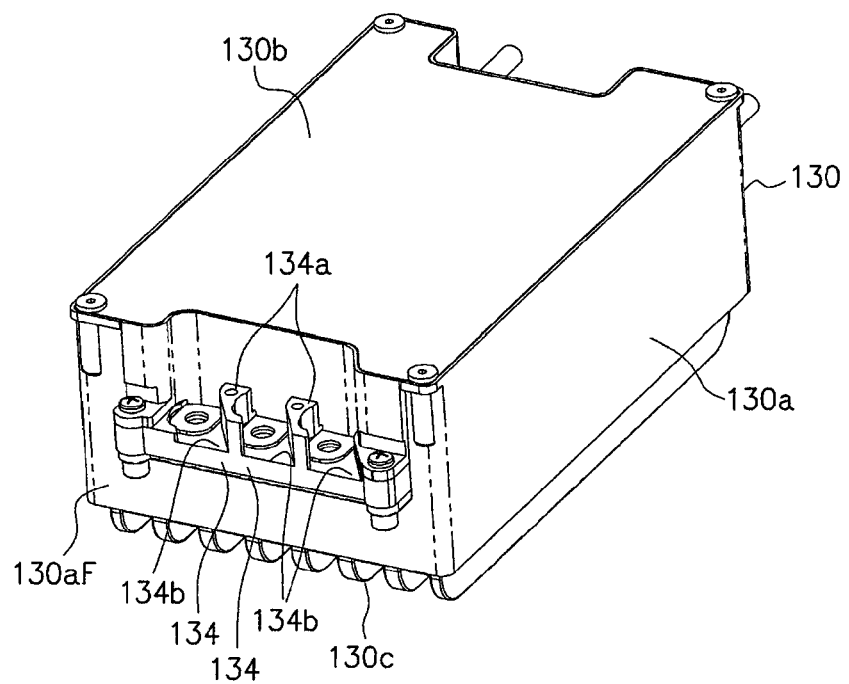
FIG. 10 is a perspective view of the controller unit according to the first embodiment, seen from the front.
Figure 11:
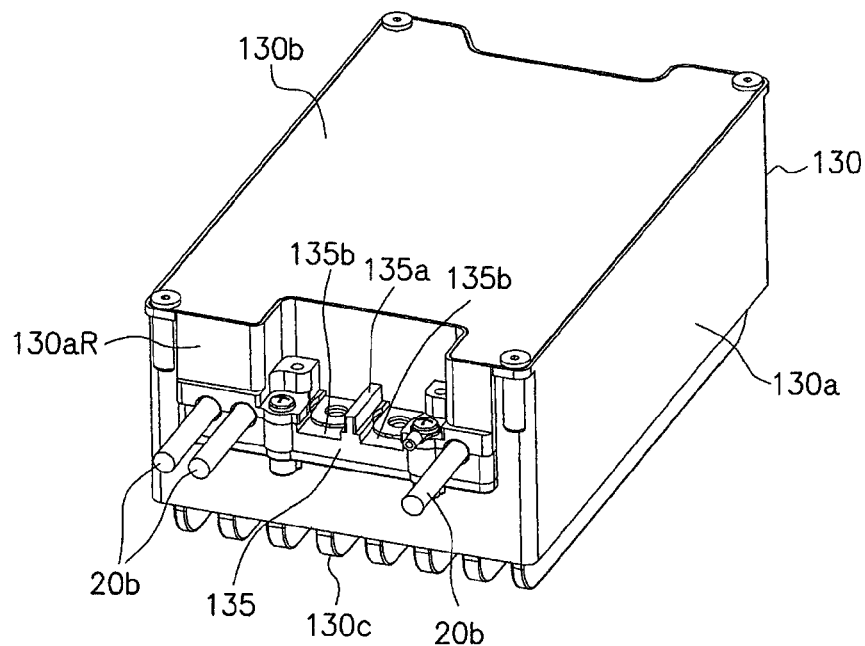
FIG. 11 is a perspective view of the controller unit according to the first embodiment, seen from the rear.

FIG. 8 shows an internal configuration of the controller unit 130. As shown in FIG. 8, a circuit board 30 is housed in the inner space of the box-shaped metal case 130*a* of a rectangular parallelepiped shape. The upper opening of the metal case 130 can be closed by the cover 130*b*. The metal case 130*a* and the cover 130*b* are formed of a conductive metal material, such as aluminum, for example.

The controller unit 130 has the circuit board 30, and, in terms of a hardware configuration, is housed in the metal case 130*a* and the cover 130*b* for protecting the circuit board 30. The controller unit 130 has a signal line group 20*b* for electrically connecting the circuit board 30 and the main control section 631. The signal line group 20*b* is led out to the outside as three cables.

Further, the controller unit 130 has an electric source and electric power line group 20*c* for electrically connecting the circuit board 30 and the battery B. Further, the controller unit 130 has a motor motive power line group 20*a* for electrically connecting the circuit board 30 and the electric motor M. The electric power line group 20*c* is constituted by a plurality of bus bars, these bus bars are led out to a rear side surface 130*a*R of an outer side of the metal case 130*a*, and terminal sections of the respective bus bars are provided in the terminal board 135 in the rear side surface 130*a*R of the metal case 130*a*. Similarly, the motor motive power line group 20*a* is constituted by a plurality of bus bars, these bus bars are led out to a front side surface 130*a*F of the outer side of the metal case 130*a*, and terminal sections of the respective bus bars are provided in the terminal board 134 in the front side surface 130*a*F of the metal case 130*a*.

Structures of the terminal boards 134, 135 are, as shown in FIG. 8 to FIG. 13, provided in the front and rear side surfaces 130*a*F and 130*a*R of the metal case 130*a*, respectively. The terminal board 134 is configured so that ring terminals 136 of three connection lines 137 connected to the electric motor M are screwed, and a guide section to guide a taking out direction (leading out direction) of these connection lines 137 to a diagonal direction in relation to the front side surface 130*a*F is provided. The guide section in this case is constituted by a recessed section 134*b* in which the ring terminal 136 is fit in the diagonal direction, and the partition wall 134*a* formed between the adjoining recessed sections 134*b*. In other words, the partition wall 134*a* is provided in a manner that both side surfaces thereof are in the diagonal direction (in the same direction as the direction of the recessed section 134*b*) in relation to the front side surface 130*a*F of the metal case 130*a*.

The terminal board 134 is constituted by an insulating material and integrally has a pedestal on which the above-described recessed section 134*b* is formed and the above-described partition wall 134*a*, and is screwed and fixed to the metal case 130*a* in an end part in a width direction of the terminal board 134. The terminal board 134 is fit in a cutout or an opening, the cutout or opening formed in the front side surface 130*a*F of the metal case 130*a*, and the terminal section of the above-described bus bar is drawn out from the inside of the metal case 130*a* via a gap formed in the terminal board 134, to be fixed to the above-described recessed section 134*b*, and in the recessed section 134*b*, a screw hole penetrating to the terminal section of the bus bar and the pedestal are formed. Into this screw hole, the ring terminal 136 of the connection line 137 is screwed as described later.

Note that though the other terminal board 135 also has a guide section constituted by the recessed sections 135*b* in which the ring terminals 136 are fit and the partition wall 135*a* formed between the adjoining recessed sections 135*b*, it is configured so that the connection line 137 to be connected is mounted vertically in relation to the rear side surface 130*a*R of the metal case 130*a*.

Figure 12:
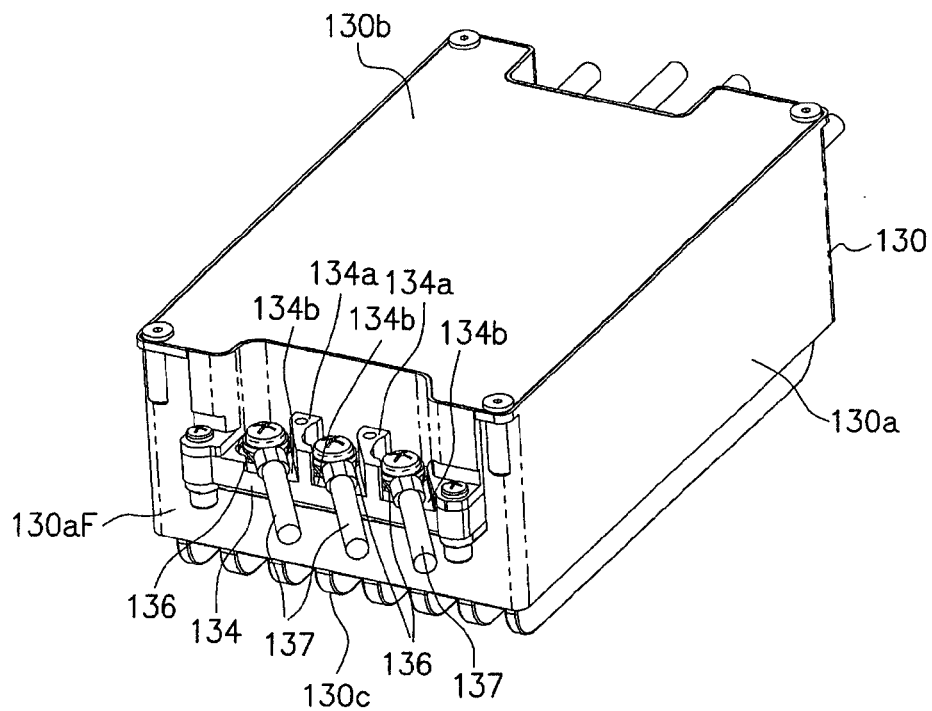
FIG. 12 is a perspective view of the controller unit to which a connection line is connected, according to the first embodiment, seen from the front.
Figure 13:
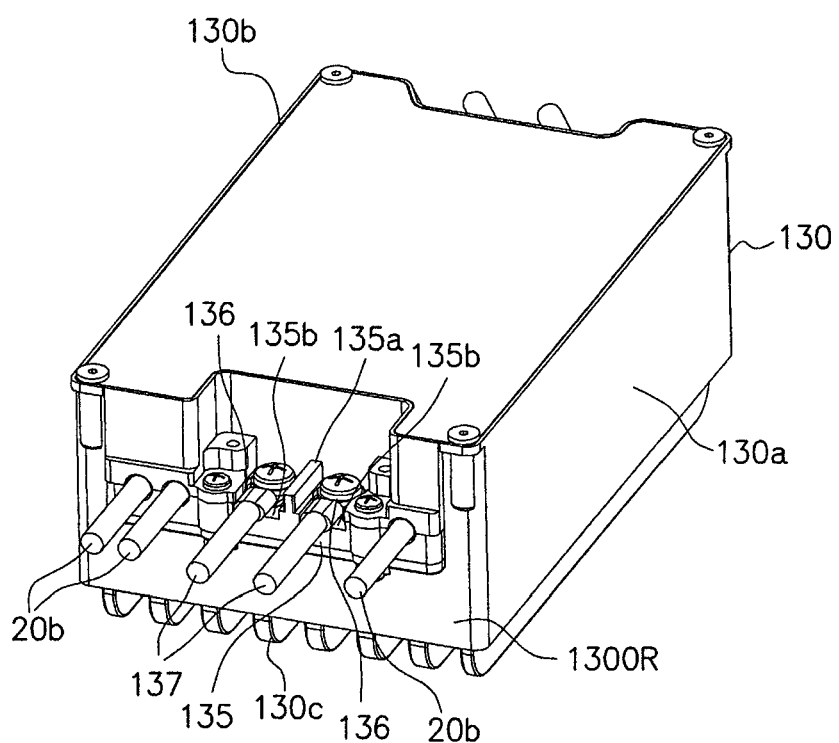
FIG. 13 is a perspective view of the controller unit to which a connection line is connected, according to the first embodiment, seen from the rear.

As shown in FIG. 12 and FIG. 13, connection lines 137 are screwed to the two terminal boards 134, 135, respectively. In the terminal board 134, ring terminals 136 of the three connection lines 137 are fit in the recessed sections 134*b* constituting the guide sections and connected by screwing in a state where the connection lines 137 are in a diagonal direction. In the other terminal board 135, the ring terminals 136 of the two connection lines 137 are fit in the recessed sections 135*b* constituting the guide sections, and connected by screwing in a state where the connection lines 137 are in a vertical direction.

In this embodiment, though an angle in a diagonal direction of the guide section, that is, an angle of a center line of the recessed section 134b is set at 60 degrees in relation to the front side surface 130aF of the metal case 130a, the angle is not limited to this value. Since intervals between a plurality of recessed sections 134b can be set further broader when a width of the terminal board 134 is enough, and in such a case, it is possible to make the angle in the diagonal direction of the guide section smaller to about 30 degrees, in other words, to set an angle to mount the connection line in relation to the metal case 130a deeper. Further, depending on a condition of the width or the like of the terminal board 134, it is also possible to set the angle in the diagonal direction of the guide section at 60 degrees or more, and even when the angle is, for example, about 80 degrees, smaller than a right angle, the connection line 137 can be drawn out in a diagonal direction from the vertical direction of the front side surface 130aF of the metal case 130a, with a margin of 10 degrees.

Further, though in this embodiment the configuration in which the partition wall 134a is combined with the above-described recessed section 134b is described as the guide section, securing a state where the taking out direction of the connection line 137 is fixed to the diagonal direction in relation to the front side surface 130aF of the metal case 130a largely depends on a function of positioning the connection line 137 by the above-described recessed section 134b.

In this embodiment, the partition wall 134a added as the guide section assists the function of positioning the connection line 137 together with the above-described recessed section 134b, and additionally, by existence of the partition wall 134a made of the insulating material, prevents contact of the adjoining ring terminals 136 during an operation of screwing the ring terminals 136 of the connection lines 137, and functions as an operational jig at a time of an operation of drawing the ring terminal 136 of the connection line 137 to the screwing position to fit the ring terminal 136 in the recessed section 135b. Therefore, in this embodiment, a workability of assembling the connection line can be improved. Further, since a load to the connection line by bending is decreased, a possibility of wire breakage of the connection line due to bending can be improved.

Second Embodiment

A second embodiment is an example in which a configuration of a controller unit and its surrounding is altered. Note that a structure of an electric motorcycle 100 and a circuit configuration of the surrounding of the controller unit are as described in the first embodiment, and explanation is done with the same reference number being given to the same component. Hereinafter, a point of difference from the configuration of the controller unit and its surrounding of the first embodiment is mainly explained, and redundant explanation will be omitted.

Figure 14:
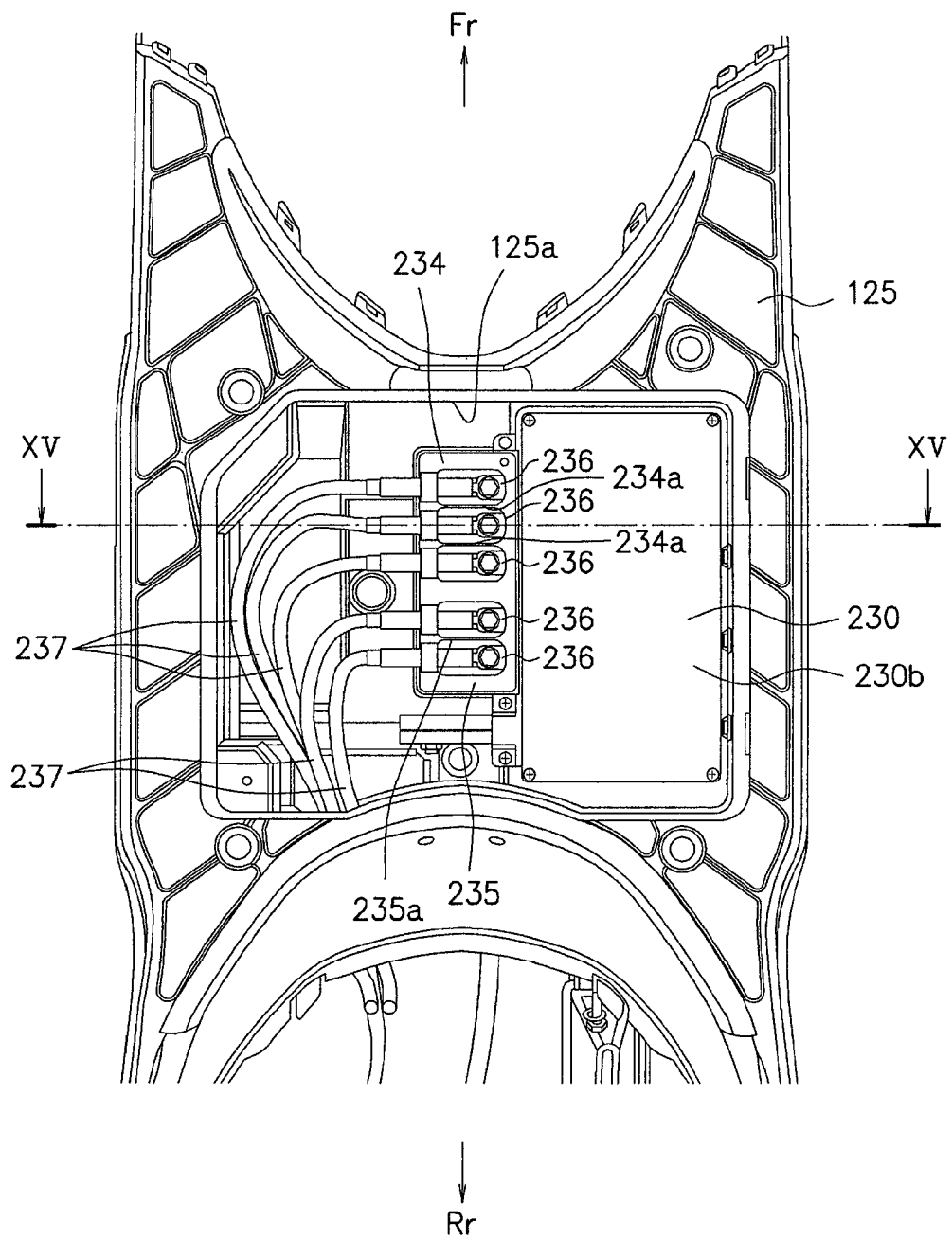
FIG. 14 is a plan view showing a footrest section in a second embodiment.
Figure 15:
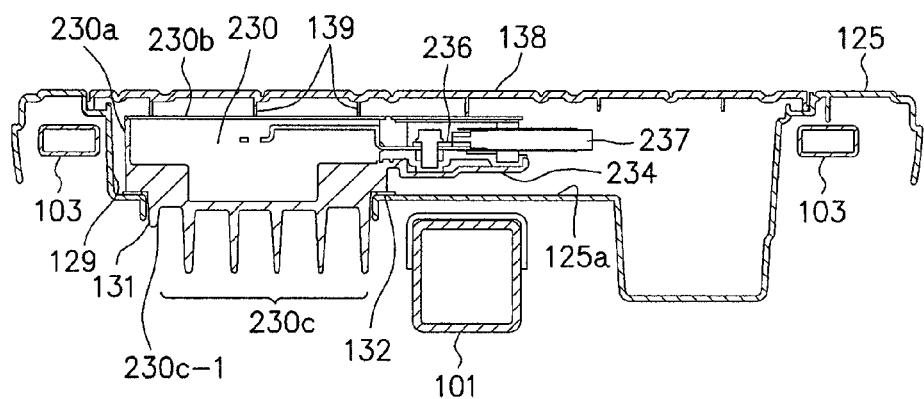
FIG. 15 is a cross-sectional view taken along a line XV-XV in FIG. 14.

FIG. 14 is a plan view showing a footrest section. FIG. 15 is a cross-sectional view taken along a line XV-XV in FIG. 14. A lower cover 125 covers upper sides of a down tube 101 and right and left auxiliary frames 103, and outer sides of the right and left auxiliary frames 103, thereby to constitute the footrest section.

Here, as shown in FIG. 15, an upper surface of the lower cover 125 is recessed downward above the down tube 101 (referred to as a recess 125a). In this embodiment, a range from a right side of the down tube 101 to an inner side of the right-side auxiliary frame 103 is used as it is as a controller housing compartment 129, instead of being further recessed as in the first embodiment. Further, in a bottom of the controller housing compartment 129 is formed an opening 131, and a resilient member 132 is provided around the opening 131.

Figure 16:
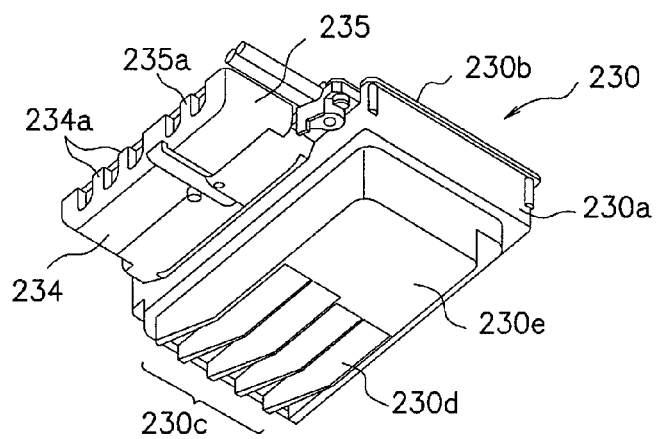
FIG. 16 is a perspective view of a controller unit according to the second embodiment, seen from a rear lower side.
Figure 17:
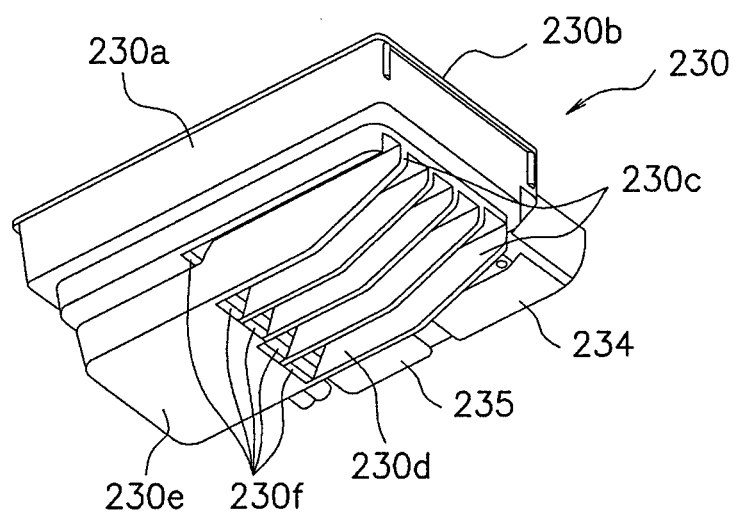
FIG. 17 is a perspective view of the controller unit according to the second embodiment, seen from a front lower side.

A controller unit 230 has, as shown in FIG. 16 and FIG. 17, a metal case 230a of a box shape long in a front and rear direction and a cover 230b closing an upper surface opening of the metal case 230a, and not-shown CPU (Central Processing Unit), ROM, RAM, and so on are housed therein. In a bottom surface of the controller unit 230, that is, in a bottom surface of the metal case 230a, except an edge part, a rear half section 230e in a vehicle traveling direction bulges more downward than a front half section 230d. Further, in a bottom surface of the front half section 230d, a plurality of cooling fins 230c of thin plate shapes extended in the front and the rear are integrally formed to have the same height as that of a bottom surface of the rear half section 230e. The plural cooling fins 230c are aligned in parallel by a predetermined pitch in a vehicle width direction, and traveling air flows backward thorough between the cooling fins 230c when the vehicle runs.

As shown in FIG. 15, it is formed so that the height of the cooling fin 230c-1 in the outest side in the vehicle width direction of the cooling fins 230c from a bottom surface of the controller unit 230 is lower than that of the cooling fin 230c of the inner side in the vehicle width direction. This is in order to avoid contact of the cooling fin 230c-1 of the outest side, which comes closest to a road surface when a vehicle body is banked, to the road surface. Note that though in this embodiment an example is shown in which the height of only the cooling fin 230c-1 of the outest side from the bottom surface of the controller unit 230 is low, modes are possible in which heights of the plural cooling fins 230 of the outer side are low and in which the heights of the cooling fins 230c become sequentially lower from the inner side to the outer side.

Further, as shown in FIG. 17, in the bottom surface of the metal case 230a, a front wall 230f of the rear half section 230e forming a step section between the front half section 230d and the rear half section 230e inclines diagonally downward to the rear between the respective cooling fins 230c. Thereby, traveling air is made to pass backward easily when flowing backward between the cooling fins 230c.

Inside the front half section 230d of the controller unit 230 is disposed the CPU (Central Processing Unit) being a circuit component whose heating value is comparatively larger than the aforementioned ROM and RAM. The cooling fins 230c are provided in the front half section 230d, and a cooling effect is high because traveling air is easy to hit, and thus the CPU (Central Processing Unit) being the circuit component whose heating value is comparatively higher than the ROM and RAM is disposed inside the front half section 230d. Besides, inside the rear half section 230e bulging downward are disposed the ROM and RAM being circuit components which are comparatively taller and have smaller heating values than the CPU (Central Processing Unit).

When the controller unit 230 is housed in the controller housing compartment 129, the opening 131 is closed by the bottom surface of the controller unit 230, and the resilient member 132 coheres to an edge part of the bottom surface of the controller unit 230.

Then, when the controller unit 230 is housed in the controller housing compartment 129, as shown in FIG. 15 the cooling fins 230c and the rear half section 230e of the controller unit 230 protrudes downward from the opening 131 to face the outside. Note that a height position of the cooling fins 230c is determined so as not to contact a road surface, similarly to in the first embodiment.

As shown in FIG. 14, terminal boards 234, 235 are disposed as connection sections in a side part of a center side in the vehicle width direction of the controller unit 130. A connection line of an electric motor M is connected to the terminal board 234 of a front side. Further, a connection line of a battery B is connected to the terminal board 235 of a rear side. To the terminal boards 234, 235, ring terminals 236 of respective connection lines are to be screwed.

Here, in the terminal board 234, partition walls 234a are standingly provided to adjoin the respective ring terminals 236, and these partition walls 234a are disposed to point to the vehicle width direction. In other words, the ring terminal 236 is put from a left side in the vehicle width direction and screwed so that the connection line 237 can be led out toward the left side in the vehicle width direction. The connection line 237 is bent by using a left-side space in the vehicle width direction of the recess 125a formed in the lower cover 125 and penetrates a hole formed in a rear wall of the recess 125a to be led out to the outside.

Further, also in the terminal board 235, similarly to in the terminal board 234, partition walls 235a are standingly provided to adjoin the respective ring terminals 236, and those partition walls 235a are disposed to point to the vehicle width direction. In other words, the ring terminal 236 is put from the left side in the vehicle width direction and screwed so that the connection line 237 can be led out toward the left side in the vehicle width direction. The connection line 237 is bent by using the left-side space in the vehicle width direction of recess 125a formed in the lower cover 125, and thereafter, penetrates the hole formed in the rear wall of the recess 125a and led out to the outside.

In a state where the controller unit 230 is housed in the controller housing compartment 129 as described above, the recess 125a formed in the lower cover 125 is closed by a foot board 138 constituting the footrest section, similarly to in the first embodiment. Ribs 139 are standingly provided in a rear surface of the foot board 138, and it is configured so that when the foot board 138 is closed the ribs 139 press an upper surface of the controller unit 230 to prevent jounce.

Hereinabove, the present invention is described with various embodiments, but the present invention is not limited to those embodiments and alteration or the like is possible in the scope of the present invention. For example, in the above-described first embodiment, the example is described in which the controller unit 130 is disposed to be deflected in the right side of the vehicle, that is, disposed to be deflected in an opposite side in the vehicle width direction to the arm section 108a (power unit 111 including the electric motor M) of the swing arm 108, but the controller unit 130 can be disposed to be deflected in the left side of the vehicle similarly to the arm section 108a of the swing arm 108. However, in the above-described second embodiment, if the controller unit 230 is disposed to be deflected in the left side of the vehicle, the connection line 237, after being led out to the opposite side in the vehicle width direction of the arm section 108a (power unit 111 including the electric motor M) of the swing arm 108, is required to be bent largely to be connected to the electric motor M. Therefore, in a case of the second embodiment, it is suitable that the controller unit 230 is disposed to be deflected in the right side of the vehicle, that is, disposed to be deflected in the opposite side in the vehicle width direction in relation to the arm section 108a (power unit 111 including the electric motor M) of the swing arm 108. Further, in each embodiment, by disposing the controller units 130, 230, which are comparatively heavy, in the opposite side in the vehicle width direction to the electric motor M being a heavy object, a weight balance of the right and left in the vehicle can be attained.

INDUSTRIAL APPLICABILITY

The present invention can be used for a scooter-type electric motorcycle using an electric motor as a drive source, and a controller unit suitable to be used therein.

The invention claimed is:

1. An electric motorcycle being a scooter electric motor cycle, the electric motor cycle comprising:
    a vehicle body frame having one down tube extended downward in a center part in a right and left direction of a vehicle body from a head pipe supporting front forks in a manner to be freely pivotable in right and left, the front forks supporting a front wheel in a manner to be freely rotatable, and thereafter the down tube is extended almost horizontally toward the rear;
    an electric motor driving a rear wheel being a drive wheel;
    a battery supplying electric power to said electric motor;
    a controller unit performing drive control of said electric motor;
    a footrest section constructed between a front wheel and the rear wheel; and
    a controller housing compartment comprising:
        a lower cover, recessed downwards, and covering a horizontal part of the down tube from upside; and
        a recess spanning the right and the left of the down tube, in said footrest section,
    wherein an opening from which a cooling fin provided in a bottom surface of said controller unit faces the outside in a state where said controller unit is housed is formed in a bottom of one side in the right and left direction across the down tube of said controller housing compartment, and
    wherein a wiring connected to said controller unit is housed in said controller housing compartment in an opposite side in the right and left direction across the down tube.

2. The electric motorcycle according to claim 1,
    wherein the opening is closed by the bottom surface of said controller unit, and
    wherein, in the bottom of said controller housing compartment, a resilient member to cohere to the bottom surface of said controller unit is provided around the opening.

3. The electric motorcycle according to claim 1,
    wherein a plurality of the cooling fins of thin plate shapes extended in the front and the rear is provided in parallel in the bottom surface of said controller unit.

4. The electric motorcycle according to claim 1,
    wherein, inside said controller unit, a circuit component whose heating value is comparatively large in comparison to a plurality of other circuit components inside said controller unit, is disposed in a front side in a vehicle traveling direction.

5. The electric motorcycle according to claim 4,
    wherein a rear half section in the vehicle traveling direction of the bottom surface of said controller unit bulges more downward than a front half section,
    wherein another circuit component is comparatively tall and has a small heating value in comparison to the plurality of other circuit components inside said controller unit, is disposed inside the rear half section,
    and wherein the cooling fins are provided in the bottom surface of the front half section.

6. The electric motorcycle according to claim 1,
wherein, in the bottom surface of said controller unit, a front wall of the rear half section forming a step section between the front half section and the rear half section inclines diagonally downward to the rear.

7. The electric motorcycle according to claim 1,
wherein a height of the cooling fin of an outer side in the vehicle width direction among the cooling fins from the bottom surface of said controller unit is formed lower than a height of the cooling fin of an inner side in the vehicle width direction.

8. The electric motorcycle according to claim 1, comprising:
a swing arm provided in the vehicle body frame in a manner to be vertically swingable, supporting the rear wheel in a manner to be freely rotatable, and supporting a power unit including said electric motor in one side in a vehicle width direction of the rear wheel,
wherein said controller unit is disposed in an opposite side to said electric motor of the power unit in the vehicle width direction in said footrest section.

9. The electric motorcycle according to claim 8,
wherein said controller unit has a configuration in which a connection section is provided in a front part or a rear part and a connection line connected to the connection section is led out obliquely in the vehicle width direction.

10. The electric motorcycle according to claim 8,
wherein said controller unit further comprises a connection section provided in a side part of the controller unit,
wherein the side part is the farthest toward the outside in the vehicle width direction, and
a connection line connected to the connection section is led out toward one side in the vehicle width direction where said electric motor is mounted.

11. The electric motorcycle according to claim 1, comprising:
a swing arm provided in the vehicle body frame in a manner to be vertically swingable, supporting the rear wheel in a manner to be freely rotatable, and supporting the power unit including said electric motor in one side in the vehicle width direction of the rear wheel,
wherein at least a part of said controller unit and a pivot shaft of said swing arm are at the same height position.

12. The electric motorcycle according to claim 1, wherein said controller unit further comprises:
a case having an internal space;
a circuit board housed in the internal space of said case;
a terminal section electrically connected to said circuit board and drawn out to a side surface of said case; and
a terminal board provided in an outer side of said case and holding said terminal section,
wherein said terminal board is provided with a guide section guiding a leading out direction of a connection line connected to said terminal section in a diagonal direction in relation to the side surface.

13. The electric motorcycle according to claim 12,
wherein the guide section provided in said terminal board of said controller unit has a recessed section in which a ring terminal of the connection line is fit.

14. The electric motorcycle according to claim 13,
wherein a plurality of said terminal sections is held adjacently in said terminal board of said controller unit,
wherein said terminal board has a plurality of the adjoining recessed sections and partition walls standingly provided between the recessed sections as the guide sections corresponding to said respective terminal sections, and
wherein the partition walls are provided in a manner that both side surfaces thereof are in the diagonal direction in relation to the side surface of said case.

15. The electric motorcycle according to claim 12,
wherein the cooling fin is provided in a surface different from the side surface of said case in which said terminal board is provided, in said controller unit.

16. The electric motorcycle according to claim 1, wherein a bottom of the recess exists at the position higher than an upper surface of the down tube.

17. An electric motorcycle comprising:
an electric motor driving a drive wheel;
a battery supplying electric power to said electric motor; and
a controller unit performing drive control of said electric motor,
wherein a rear half section in a vehicle traveling direction of a bottom surface of said controller unit bulges more downward than a front half section,
wherein a circuit component having comparatively a small heating value, in comparison to a plurality of other circuit components inside the controller unit, is disposed inside the rear half section, and
wherein a cooling fin is provided in the bottom surface of the front half section.

18. The electric motorcycle according to claim 17,
wherein, in the bottom surface of said controller unit, a front wall of the rear half section forming a step section between the front half section and the rear half section inclines diagonally downward to the rear.

19. The electric motorcycle according to claim 17,
wherein a height of the cooling fin of an outer side in the vehicle width direction among the cooling fins from the bottom surface of said controller unit is formed lower than a height of the cooling fin of an inner side in a vehicle width direction.

* * * * *